United States Patent [19]

Kull

[11] 4,101,175
[45] Jul. 18, 1978

[54] RAILWAY HOPPER CAR FOR UNLOADING LADINGS WHICH DO NOT READILY FLUIDIZE

[75] Inventor: George A. Kull, St. Charles, Mo.

[73] Assignee: ACF Industries, Incorporated, New York, N.Y.

[21] Appl. No.: 815,887

[22] Filed: Jul. 15, 1977

Related U.S. Application Data

[63] Continuation of Ser. No. 644,362, Dec. 24, 1975, abandoned.

[51] Int. Cl.² ............................................. B65G 53/12
[52] U.S. Cl. ..................................... 302/53; 105/248; 222/136
[58] Field of Search ................ 302/52, 53; 214/83.28; 222/394, 399, 136; 105/247, 248

[56] References Cited

U.S. PATENT DOCUMENTS

| | | | |
|---|---|---|---|
| 2,524,919 | 10/1950 | Meincke | 302/53 |
| 2,761,741 | 9/1956 | Shields | 302/53 |
| 3,288,537 | 11/1966 | Hitch | 302/53 |
| 3,403,943 | 10/1968 | Stine et al. | 302/52 |

Primary Examiner—Evon C. Blunk
Assistant Examiner—Jeffrey V. Nase
Attorney, Agent, or Firm—Henry W. Cummings

[57] ABSTRACT

A hopper is provided having a discharge outlet including a lading control valve for metering the lading into a discharge tube extending below the hopper. The discharge tube at one of its ends is adapted to receive a lading transfer conduit to convey the lading to a container. A first conduit is provided to apply air pressure from an air supply source adjacent the hopper to the upper portion of the hopper in the car. A second conduit is provided to apply air pressure from the source into a first end portion of the discharge tube. A third conduit is connected to the source and to the second conduit to apply air pressure to the opposite end portion of the discharge tube. A first air control valve is provided to control the air pressure applied to the upper portion of the hopper. A second air control valve is provided for controlling air pressure applied to the end portion of the discharge tube to be used for unloading. A third air control valve is provided to control the air pressure applied to the opposite end portion of the discharge tube. For railway hopper car applications in which the transverse and/or vertical dimensions of the hopper are close to AAR transverse clearance limits, the air pressure may be applied internally to the upper portion of the hopper through a standpipe which is provided in at least one hopper compartment in the car. If more than one hopper compartment is provided, opening may be provided in transverse bulkheads dividing the compartments so that the air pressure is applied to all hopper compartments to be unloaded.

2 Claims, 7 Drawing Figures

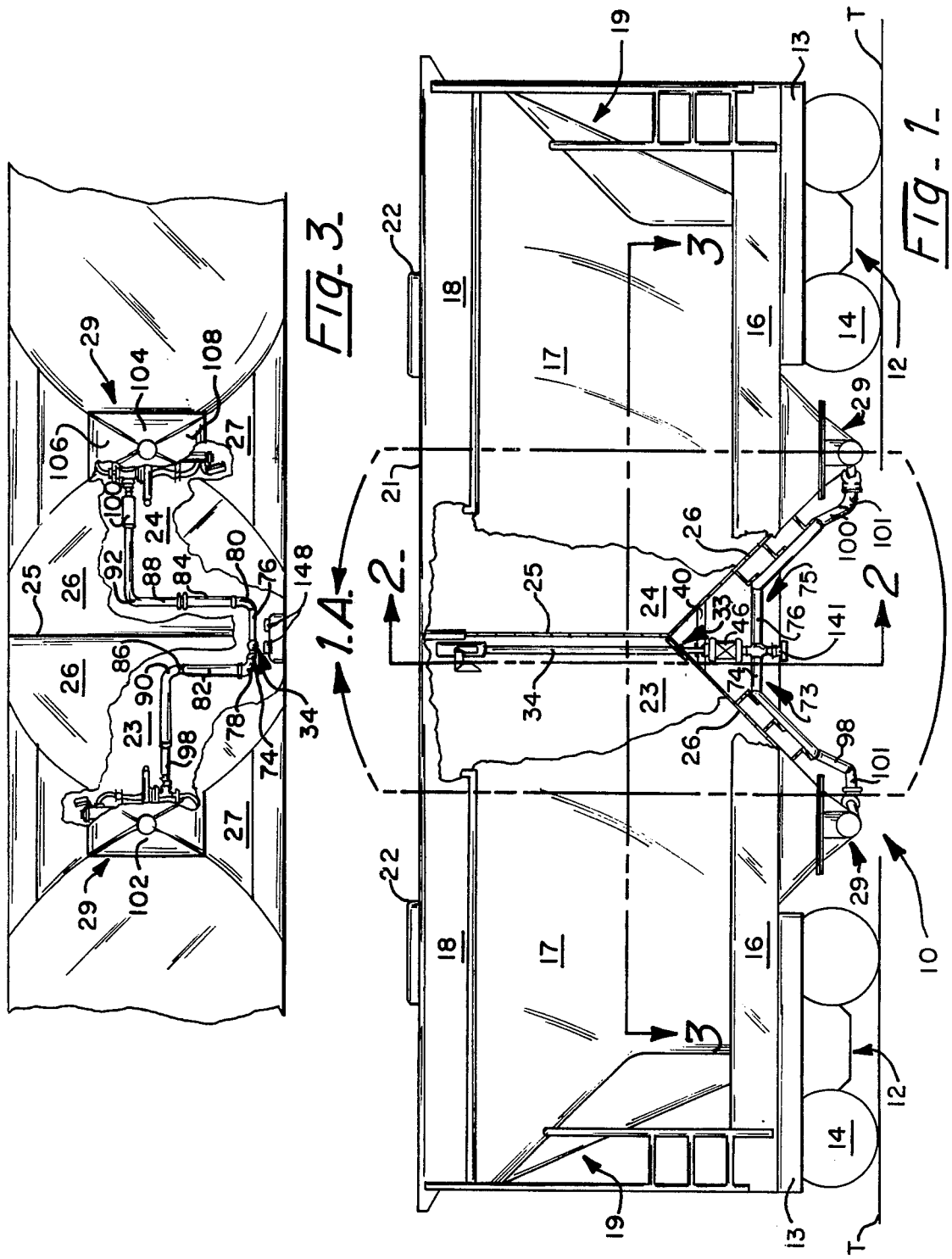

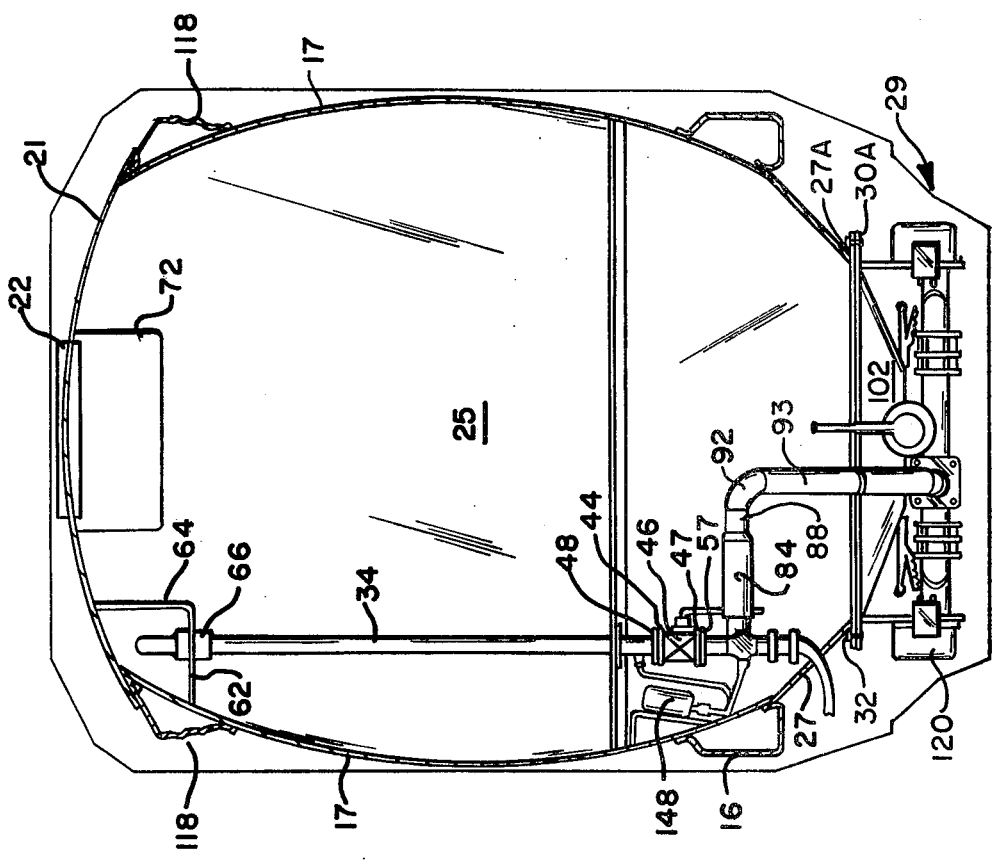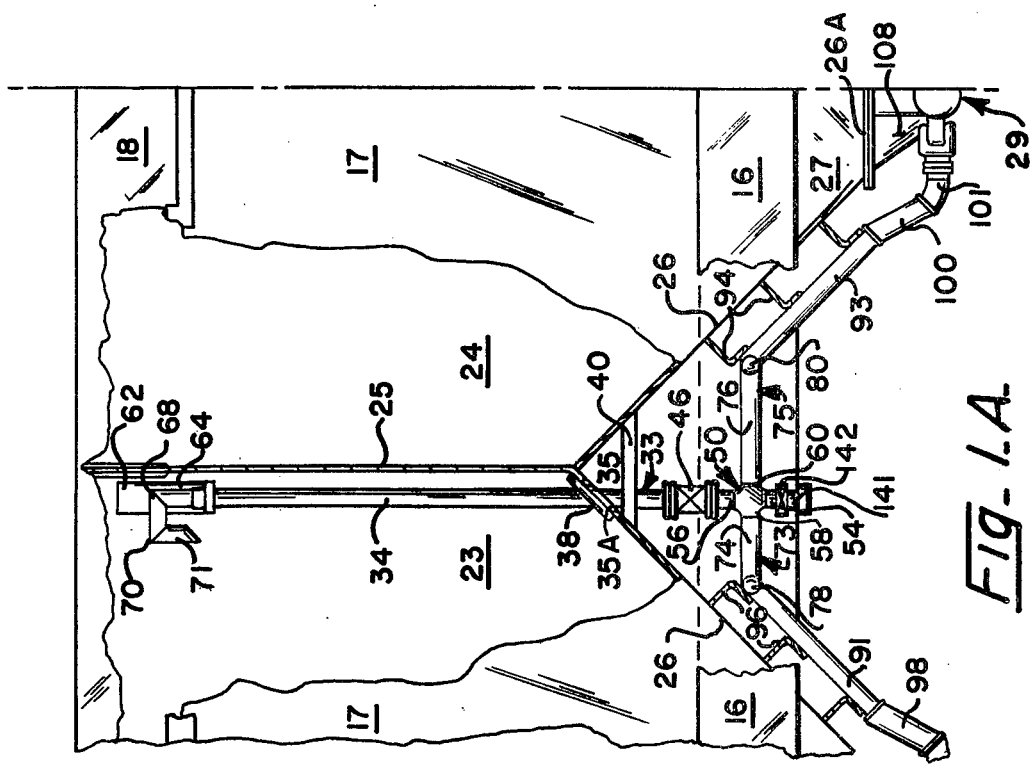

RAILWAY HOPPER CAR FOR UNLOADING LADINGS WHICH DO NOT READILY FLUIDIZE

This is a continuation, of application Ser. No. 644,362, filed Dec. 24, 1975 now abandoned.

BACKGROUND OF THE INVENTION

This invention relates to an apparatus for unloading difficult to fluidize particulate lading from hoppers including industrial bins, overland hopper trucks, intermodal transit hopper type containers and particularly railway hopper cars.

Particulate ladings which readily fluidize, such as plastic pellets are conventionally unloaded from hoppers by means of a fluidizing outlet comprising a permeable membrane. Pressurized air at the unloading site is connected to the outlet and passes through the permeable membrane and upwardly into the outlet to fluidize the lading. The pressurized air and the lading are then metered into a discharge tube and are unloaded from the discharge tube through a transfer pipe into the container to be filled.

However, some ladings do not readily fluidize. Examples include caustic prills, polyvinyl chloride resin, corn starch and cement. If unloading of non-fluidizable particulate ladings is attempted by the fluidizing technique described above, clogging of the outlet generally occurs and the unloading is unsuccessful.

In U.S. Pat. No. 3,019,058 cement is unloaded from a mixing hopper having a discharge tube extending outwardly from the lower portion of the hopper. Air pressure is applied to a control valve located above the top of the hopper. One conduit extends from the control valve to an opening in the top of the hopper. Another conduit extends from the valve to the lower portion of the hopper in line with the discharge tube. A further pair of conduits extend from the control valve to the discharge tube. The control valve may be actuated to apply air under pressure to either one or a pair of the conduits. This arrangement does not include a lading control valve for metering the lading into the discharge tube. However, a lading control valve in a similar pneumatic conveying system is shown in U.S. Pat. No. 2,734,782. The conduit and valve arrangements in each of these patents lack the flexibility to apply air pressure to various portions of the hopper and to the discharge tube in order to maintain efficient unloading rates and avoid clogging and downtime during unloading. For example, with the arrangement in these patents air pressure cannot be simultaneously applied to the top of the hopper, to the discharge tube and to the conduit extending to the lower portion of the hopper in line with the discharge tube.

Also in these patents air is supplied to the upper portion of hopper by a conduit extending outside the hopper which could cause problems with compliance with the Association of American Railroads (AAR) transverse and vertical clearance requirements if such an arrangement were used in a railway hopper car.

THE DRAWINGS

FIG. 1 is a side elevation view of a railway hopper car with portions broken away illustrating the unloading apparatus of the present invention;

FIG. 1a is an enlarged view along the lines 1A—1A in FIG. 1;

FIG. 2 is a sectional view looking in the direction of the arrows along the line 2—2 in FIG. 1 which also illustrates the (AAR) hopper car clearance requirements;

FIG. 3 is a plan view looking in the direction of the arrows along the line 3—3 in FIG. 1;

SUMMARY OF THE INVENTION

Figure 6:
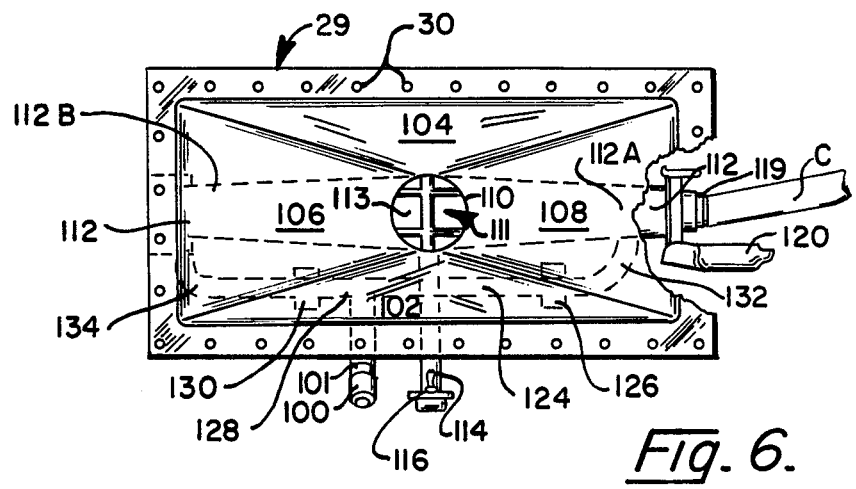
FIG. 6 is a plan view of outlet illustrated in FIGS. 4 and 5, with a portion broken away.

It is an object of the present invention to provide apparatus for unloading from hoppers ladings which do not readily fluidize, with air pressure, which apparatus has sufficient flexibility to maintain efficient unloading rates.

It is another object of the invention to provide such air pressure unloading apparatus for railway hopper car applications which is in compliance with AAR clearance requirements.

A hopper is provided having a discharge outlet including a lading control valve for metering the lading into a discharge tube extending below the hopper. The discharge tube at at least one of the ends is adapted to receive a lading transfer conduit to convey the lading to a container. A first conduit is provided to apply air pressure from an air supply source adjacent the hopper to the upper portion of the hopper. A second conduit is provided to apply air pressure from the source into a first end portion of the discharge tube. A third conduit is connected to the source and to the second conduit to apply air pressure to the opposite end portion of the discharge tube. A first air control valve is provided to control the air pressure applied to the upper portion of the hopper. A second air control valve is provided for controlling air pressure applied to the first end portion of the discharge tube to be used for unloading. A third air control valve is provided to control the air pressure applied to the opposite end portion of discharge tube.

To unload the lading the transfer conduit is first attached to one end of the discharge tube and the first air control valve is opened to apply air pressure to the upper portion of the hopper to urge the lading downwardly, thus providing a gravity assist. The lading control valve is then opened and lading is metered into the discharge tube. The second air control valve is then opened to assist in transporting the lading from the discharge tube through the transfer conduit into the container. The third air control valve may be opened to remove any lading which may become clogged in the lower portion of the hopper or in the discharge tube, and to assist in transporting the lading through the transfer conduit to the container where the lading transfer conduit is unusually long, or where rapid unloading of the hopper is desired.

For railway hopper car applications in which the transverse and/or vertical dimensions of the hoppers are close to AAR clearance limits, the air pressure may be applied internally to the upper portion of the hopper through a standpipe which is provided in at least one hopper compartment in the car. If more than one hopper compartment is provided, openings may be provided in transverse bulkheads dividing the compartments so that the air pressure is applied to all hopper compartments to be unloaded.

DESCRIPTION OF PREFERRED EMBODIMENTS

A railway hopper car is illustrated in FIG. 1 generally at 10. The car includes conventional railway car trucks 12 at opposite ends having wheels 14 which engage a track T. Trucks 12 support stub sills 13 at opposite ends of the car. The car includes transversely spaced side sills 16 and transversely spaced side plates 18. Curved sides 17 connect side sills 16 and side plates 18. For purpose of illustration, two hopper compartments 23 and 24 are shown in the drawings, but only one compartment or three or more hopper compartments may be provided. The car includes conventional end structure 19 and a roof 21 having hatch compartments for loading illustrated at 22. Hopper compartments 23 and 24 are divided by a transverse bulkhead 25. Each of the hoppers 23 and 24 include inclined slope sheets 26 extending transversely of the car and inclined slope sheets 27 extending longitudinally of the car (FIG. 2). Outlets indicated generally at 29 are affixed to mounting frames 26a and 27a on lower portions of the slope sheets 26 and 27 by means of a suitable opening 30 provided in outlet mounting flange 30a through which fasteners 32 (FIG. 2) may pass to hold the outlet in place.

In accordance with the present invention, a first conduit 33 is provided to apply air pressure from a source adjustment the car to the upper portion of the hoppers in the car. The conduit 33 includes standpipe portion 34 extending upwardly through an opening 35a in slope sheet 26 into the hopper 23, preferably adjacent bulkhead 25. Suitable standpipe reinforcing plates may be provided. For example as shown best in FIG. 1A, a reinforcing plate 38 may be provided on slope sheet 26 and a reinforcing plate 40 mounted between hoppers 23 and 24.

In the upper portion of the car, a pair of angle mounting brackets 62 and 64 (FIGS. 1A and 2) are mounted on the car. These brackets hold in place a sleeve 66. Standpipe 34 fits concentrically within sleeve 66 and allows vertical movement of standpipe 34 relative to the car body as the car body may flex or bend during transit. Standpipe 34 is preferably provided with one or more 90° bends 68 and 70 terminating in a opening 71 adapted to direct pressurized gas inwardly and downwardly into compartment 23. Furthermore, as shown best in FIG. 2, an opening 72 is provided in bulkhead 25. Pressurized gas exiting from standpipe 34 will not only enter compartment 23 but will also enter compartment 24.

For railway hopper car applications, mounting the first conduit 33 within the hopper rather than externally thereof has the advantage that AAR transverse clearance requirements may be complied with. It will be apparent from FIG. 2 that curved sides 17, roof 21 and hatches 22 are close to the maximum transverse and vertical dimensions and that a loss of hopper volume would be necessitated if the standpipe were to be mounted externally of the hopper because the transverse and/or the vertical portion of the car would have to be reduced to meet the AAR clearance requirements.

In hopper car applications where clearance is not a problem the first conduit may be applied externally of the hopper and connected to an opening in the upper portion of the hopper in any manner such as illustrated in the hereinabove cited U.S. Pat. Nos. 2,734,782 and 3,019,058, with appropriate fittings to maintain the car under pressure.

A first control valve 46 is provided to control the air pressure applied through conduit 33 to the upper portion of the hopper containing the lading. Valve 46 preferably has a mounting flange 44 to which a cooperating mounting flange 48 on conduit 33 is attached.

A pipe cross 50 has four branches; an inlet branch 54, a vertical branch 56 engaging control valve 46, and a pair of horizontally directed branches 58 and 60. A source of air pressure is adapted to be connected to inlet branch 54 by means of fitting 141. A check valve is provided at 142 to prevent the hoppers from depressurizing in the event the coupling at 141 is inadvertently disconnected. Vertical branch 56 has a mounting flange 57 which engages a mounting flange 47 on control valve 46.

To each of the horizontally extending connections 58 and 60 on the cross 50 are affixed second conduits for connecting the source of air pressure to the vicinity of the outlet 29 and to one end portion of discharge tube 112. These second conduits 73 and 75 include horizontal pipe sections 74 and 76 welded to horizontal portions 58 and 60 of cross 50. Each of the pipes 74 and 76 has a 90° elbow therein 78 and 80 (FIG. 1A). Connected to each of the 90° elbows 78 and 80 respectively are flexible hoses 82 and 84 which extend inwardly and transversely of the car. Connected to each of the flexible hoses 82 and 84 are pipe sections 86 and 88, each having a 90° bend therein 90 and 92, and inclined portions 91 and 93. As can be seen from FIG. 1A inclined portions 91 and 93 extend downwardly along the slope sheets and are supported by suitable bracket members indicated respectively at 94 and 96. Portions 91 and 93 of pipe sections 86 and 88 are then respectively connected to flexible hoses 98 and 100. Hoses 98 and 100 are each connected to adapters 101 on similar outlets 29.

Figure 5:
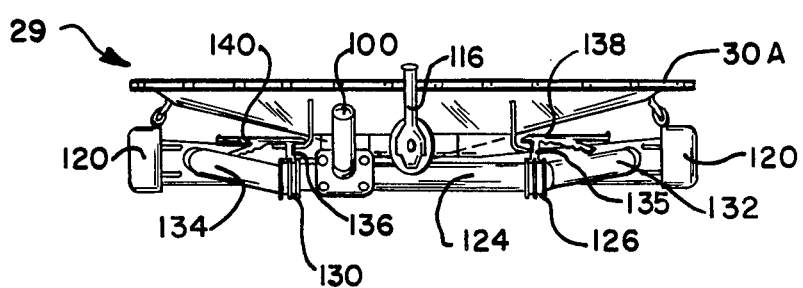
FIG. 5 is a side view of the outlet illustrated in FIG. 4.
Figure 4:
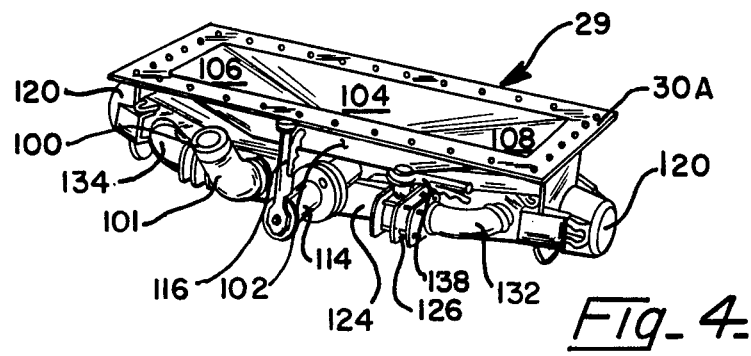
FIG. 4 is a perspective view of the hopper outlet illustrating the second and third conduit connections to the outlet.

Since these outlets are the same only one will be described. As shown in FIGS. 4–6 outlet 29 comprises inclined side walls 102, 104, 106 and 108 which are inclined downwardly to a discharge opening 110. A lading control valve 111 is mounted in this opening to meter the flow of lading into a discharge tube 112 extending generally transversely of the car. As an example, valve 111 is illustrated as a butterfly valve 113 mounted on a shaft 114 having an operator 116.

Flexible hose 100 directs the unloading air through adapter 101 into a longitudinally extending conduit 124 having a second air control valve therein 126 which applies air pressure through conduit portion 132 to a first end portion 112a of discharge tube 112. A third conduit 128 having a third air control valve therein 130 directs air into discharge tube 112 through conduit portion 134 at a second end portion 112b of discharge tube 112. Second and third air control valves 126 and 130 may be of any suitable construction. As an example, butterfly valves are illustrated each having respective shafts 135 and 136, and operating handles 138 and 140. Third conduit 128 is illustrated as a branch of the second conduit connecting the end portion 112a of discharge tube 112 with the air pressure surface. However, if desired a separate conduit may be run from the air pressure source 141 to the second end portion 112b of conduit 112. The outlet can be unloaded from either side of the car by means of discharge connections 119 on either end of discharge tube 112 adapted to receive a transfer conduit C (FIG. 6) connected to the container being filled during unloading. Removable caps 120 cover these connections when they are not being used.

In operation cap 120 is removed from discharge tube 112 on the side of the tube to be unloaded, and transfer conduit C is connected to connection 119. For purposes of illustration, it will be assumed that the right side being unloaded as viewed in FIGS. 4–6. Air control valve 46 is opened. Lading control valve 112, and air control valves 126 and 130 are closed. A source of air pressure is then connected to connection 141.

Air passes upwardly through standpipe 34 and passes into hoppers 23 by means of 90° bends 68 and 70 to pressurize the hopper. If a railway hopper car having two or more components is being unloaded, then the air will pass into other compartments by means of openings 72 in bulkhead 25. Suitable pressure gauges 148, FIG. 2, are provided to indicate the pressure differential between the inlet pressure and the pressure in the car or hopper as the case may be.

After the car has been pressurized, for example, to between 6 and 6½ psi, the air control valve nearest to the side of the hopper that is being used for unloading is opened, in this case second air control valve 126. Lading control valve 111 is then opened and the product begins to discharge into discharge tube 112 and outwardly through discharge connection 119. During unloading, the air introduced at the top of the hopper forces the lading downwardly along the slope sheets 25 and 26 and along the outlet slope sheets 102, 104, 106 and 108. This is particularly beneficial in handling a lading which does not readily fluidize. The pressure acting from above under dynamic conditions is believed to significantly facilitate unloading over what can be achieved by applying unloading pressure to the lower portion of the car. In the event that clogging occurs, third air control valve 130 may be opened to assist in the breaking up of any clogging in the hopper and/or conduit 118. Furthermore, if the transfer conduit C connected to connection 119 is unusually long, third air control valve 130 may be opened. Or, if particularly rapid discharge is desired, valve 130 may be opened. It will be apparent that with the second and third air control valves 126 and 130 the operator has considerable flexibility in meeting varying unloading conditions. if there is clogging in the discharge tube 112, one or both of these valves may be effectively utilized to apply air pressure to break up such clogging and insure efficient unloading.

During unloading from the left side as viewed in FIGS. 4–6, longitudinal conduit 128 is part of the second conduit connecting the air pressure source to a first end 112b of discharge tube 112, and conduit 124 constitutes a third conduit connecting end portion 112a of discharge tube 112 to the source of pressurized gas. During unloading from the left side air control valve 126 is the second air control valve and valve 128 is the third air control valve.

In general, only one of hoppers 23 or 24 will be unloaded at a time and thus only one of outlets 29 will be utilized, in which case the lading control valve on such outlet and the air control valves on the outlet not utilized would remain closed. However, it is within the scope of the present invention to unload two or more hoppers simultaneously and by appropriate regulation of the lading control valves and air control valves on the respective outlets, simultaneous unloading may be successfully carried out.

What is claimed is:

1. A railway hopper car for the transport of ladings which do not readily fluidize comprising:

a railway car having at least two longitudinally spaced hoppers, the upper portion of which are in fluid communication; each of said hoppers having longitudinally spaced, inclined hopper slope sheets extending downwardly toward a transversely extending pressure discharge outlet located in the lower portion of each hopper; each outlet including a lading control valve for metering the lading into a discharge tube extending transversely of the car below its respective hopper; said discharge tube at opposite ends having a connection to receive a lading transfer conduit to convey the lading to a container; conduit connecting means located adjacent the car below said hopper slope sheets for receiving a source of air pressure; a first conduit extending from said source at least partially internally within at least one of said hoppers and comprising a standpipe extending vertically to the upper portion of the hopper; a sleeve in the upper portion of said one hopper and said standpipe being movable vertically within said sleeve; a pair of second conduits extending in opposite directions from said source, generally longitudinally of the car and then transversely and downwardly from said source below said hopper slope sheets to about the transverse mid portion of the car into respective first end portions of each of said discharge tubes; a pair of third conduits each in communication respectively with an end portion of the adjacent second conduit and extending respectively to the opposite end portion of the adjacent discharge tube; a first air control valve located in said first conduit below said hopper slope sheets to control the air pressure applied to the upper portion of the hoppers; a pair of second air control valves located in each of said second conduits adjacent its respective outlet for controlling air pressure applied to respective end portions of each of said discharge tubes; a pair of third air control valves located in each of said third conduits to control air pressure applied to the respective opposite end portions of said discharge tubes; whereby said first, second and third conduits are in compliance with AAR clearance requirements without modifying the structure of the hoppers to reduce the carrying capacity of the car, and whereby when the first air control valve is opened, air pressure is applied to the upper portion of each of said hoppers through said first conduit, passing within one of said hoppers to urge the lading downwardly, the lading control valve in the first hopper outlet being unloaded metering lading into the discharge tube located below the first hopper being unloaded; the second conduit in the outlet being unloaded applying pressure to assist in transporting the lading from the discharge tube into the container essentially entirely by pressure without significant fluidization, whereby the third air control valve in the outlet being unloaded may be opened to apply pressure to further assist in transporting the lading through the transfer conduit to the container essentially entirely by pressure without significant fluidization, and whereby after unloading said first hopper outlet, said lading transfer conduit may be removed from the discharge tube of the first outlet unloaded, and quickly attached to the second outlet to be unloaded, to unload the second hopper.

2. A railway hopper car according to claim 1 wherein said hoppers are separated by a transverse bulkhead and fluid communication is provided between the hoppers by at least one opening provided in the upper portion of said transverse bulkhead.

* * * * *